United States Patent
Gupta et al.

(10) Patent No.: US 9,032,373 B1
(45) Date of Patent: May 12, 2015

(54) END TO END TESTING AUTOMATION AND PARALLEL TEST EXECUTION

(71) Applicant: International Business Machines Corporation, Armonk, NY (US)

(72) Inventors: Ritesh K. Gupta, Hyderabad (IN); Santosh K. Janumahanthi, Hyderabad (IN); Nagesh M V G V, Hyderabad (IN); Venkata R. Somisetty, Hyderabad (IN); Praveen Thota, Hyderabad (IN); Vikram K. Vb, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/138,362

(22) Filed: Dec. 23, 2013

(51) Int. Cl.
G06F 9/44 (2006.01)
G06F 11/36 (2006.01)

(52) U.S. Cl.
CPC .................... G06F 11/3688 (2013.01)

(58) Field of Classification Search
USPC ......................................................... 717/127
See application file for complete search history.

(56) References Cited

U.S. PATENT DOCUMENTS

| | | | |
|---|---|---|---|
| 7,788,639 B2 | 8/2010 | Betzler et al. | |
| 7,890,951 B2 | 2/2011 | Vinberg et al. | |
| 8,166,458 B2* | 4/2012 | Li et al. | 717/124 |
| 8,250,355 B2 | 8/2012 | Eilam et al. | |
| 8,341,462 B2* | 12/2012 | Broda et al. | 714/25 |
| 8,458,700 B1 | 6/2013 | Arrance et al. | |
| 2001/0012986 A1 | 8/2001 | Conan et al. | |
| 2004/0128651 A1 | 7/2004 | Lau | |
| 2012/0272242 A1 | 10/2012 | Jeon et al. | |
| 2013/0014084 A1* | 1/2013 | Sahibzada et al. | 717/124 |
| 2013/0117611 A1* | 5/2013 | Chakraborty et al. | 714/33 |
| 2014/0245264 A1* | 8/2014 | Bartley et al. | 717/124 |

FOREIGN PATENT DOCUMENTS

EP 2043320 B1 12/2009

OTHER PUBLICATIONS

Fonseca, "A Parellel Execution Approach for Efficient Regression Testing in the OutSystems Test Infrastructure", Instituto Superior Tecnico, Nov. 2009, pp. i-52.
"Execution adapter selection", Help—IBM Rational Software, pp. 1-3, provided by searcher, search report dated Aug. 5, 2013, <pic.dhe.ibm.com/infocenter/clmhelp/v4r0/index.jsp?topic=%2Fcom.ibm.rational.test.qm.doc%2Ftopics%2Fc_adapter_selection.html>.
"Private Clouds Float With IBM Systems and Software", White Paper, Ideas International, Custom Consulting Services, Prepared for IBM, Feb. 2011, pp. 1-10.

* cited by examiner

*Primary Examiner* — Philip Wang
(74) *Attorney, Agent, or Firm* — Stephen R. Yoder

(57) ABSTRACT

Provisioning and/or configuring machines (real and/or virtual) for multiple parallel execution of multiple test cases. The test cases correspond to different software configurations (such as different platform version and product version configurations) and are executed at substantially overlapping time(s), which is to say in "parallel."

9 Claims, 7 Drawing Sheets

END TO END TESTING AUTOMATION AND PARALLEL TEST EXECUTION

BACKGROUND OF THE INVENTION

The present invention relates generally to the field of software development, and more particularly to testing software for use with different operating platforms.

During software development, it is conventional to execute a predefined set of test cases (see definition, below, in the Definitions sub-section of the Detailed Description section of this document) in various test phases. A typical software development process involves test phases including: (i) build verification test; (ii) acceptance test; (iii) smoke test; (iv) sanity test; and (v) regression test.

Generally speaking, each test case covers a different test case configuration (herein simply called "configuration"), with the configuration including the following attributes: (i) software product (for example, product version including patch and build numbers); (ii) test phase and/or (iii) platform (see definition, below, in Definitions sub-section of the Detailed Description section). Once test cases are chosen, based on the configurations to be tested, machines (for example, real and/or virtual computers) must be provisioned and configured in order to run the test cases. The test cases are run in series (that is, sequential order, not overlapping in time) in conventional test case run environments.

SUMMARY

In one aspect of the present invention, a method, a computer program product, and a system includes: receiving a plurality of test cases respectively corresponding to a plurality of software configurations, provisioning a set of computing resources for running the plurality of test cases at least substantially in parallel, and configuring the set of computing resources for running the plurality of test cases at least substantially in parallel. The provisioning and configuring actions are performed automatically by machine logic.

DETAILED DESCRIPTION

Figure 1:
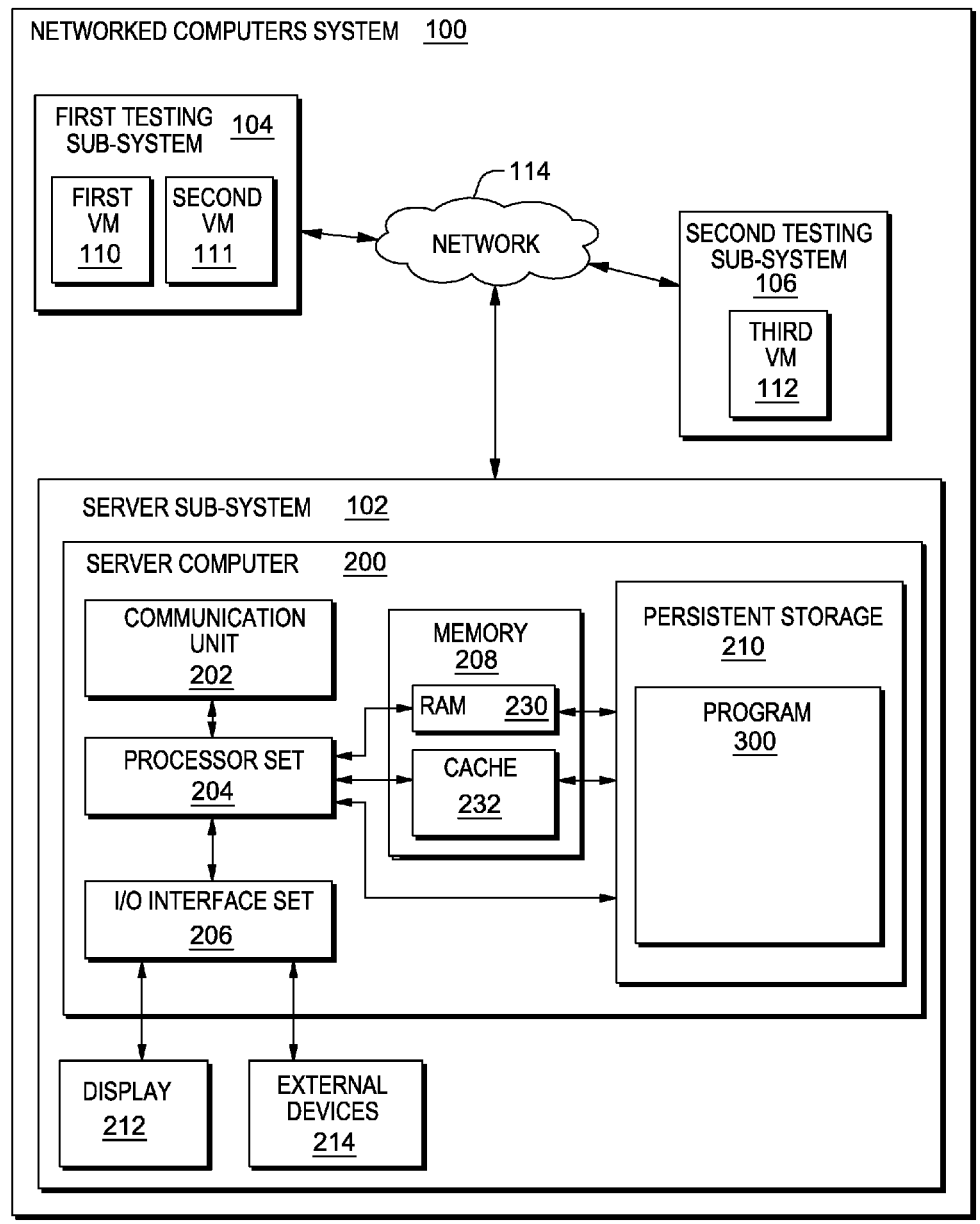
FIG. 1 is a schematic view of a first embodiment of a networked computers system according to the present invention.

Some embodiments of the present invention automatically, and substantially without human intervention, provision and/or configure machines for multiple parallel execution of multiple test cases (see definition, below in the Definitions sub-section). This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object-oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagram block or blocks.

An embodiment of a possible hardware and software environment for software and/or methods according to the present invention will now be described in detail with reference to the Figures. FIG. 1 is a functional block diagram illustrating various portions of networked computers system 100, including: server sub-system 102; first testing sub-system 104 (including first and second virtual machines (VMs) 110, 111); second testing sub-system 106 (including third VM 112); communication network 114; and server computer 200. The server computer includes: communication unit 202; processor set 204; input/output (i/o) interface set 206; memory device 208; persistent storage device 210; display device 212; external device(s) 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, a tablet computer, a netbook computer, a personal computer (PC), a desktop computer, a personal digital assistant (PDA), a smart phone, or any programmable electronic device capable of communicating with the client sub-systems via network 114. Program 300 is a collection of machine-readable instructions and/or data that is used to create, manage, and control certain software functions that will be discussed in detail, below, in the Example Embodiment sub-section of this Detailed Description section.

Sub-system 102 is capable of communicating with other computer sub-systems via network 114 (see FIG. 1). Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIG. 1 provides only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications, and the like.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications, and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective processor set 204, usually through one or more memories of memory 208. Persistent storage 210: (i) is at least more persistent than a signal in transit; (ii) stores the device on a tangible medium (such as magnetic or optical domains); and (iii) is substantially less persistent than permanent storage. Alternatively, data storage may be more persistent and/or permanent than the type of storage provided by persistent storage 210.

Program 300 may include both machine-readable and performable instructions and/or substantive data (that is, the type of data stored in a database). In this particular embodiment, persistent storage 210 includes a magnetic hard disk drive. To name some possible variations, persistent storage 210 may include a solid-state hard drive, a semiconductor storage device, a read-only memory (ROM), an erasable programmable read-only memory (EPROM), a flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communication unit 202, in these examples, provides for communications with other data processing systems or devices external to sub-system 102, such as client sub-systems 104, 106, First VM 110, and Third VM 112. In these examples, communication unit 202 includes one or more network interface cards. Communication unit 202 may provide communications through the use of either or both physical and wireless communications links. Any software modules discussed herein may be downloaded to a persistent storage device (such as persistent storage 210) through a communications unit (such as communication unit 202).

I/O interface set 206 allows for input and output of data with other devices that may be connected locally in data communication with server computer 200. For example, I/O interface set 206 provides a connection to external device(s) 214. External device(s) 214 will typically include devices such as a keyboard, a keypad, a touch screen, and/or some other suitable input device. External device(s) 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus, the invention should not be limited to use solely in any specific application identified and/or implied by such nomenclature.

II. Example Embodiment

Preliminary note: The flowchart and block diagrams in the following Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
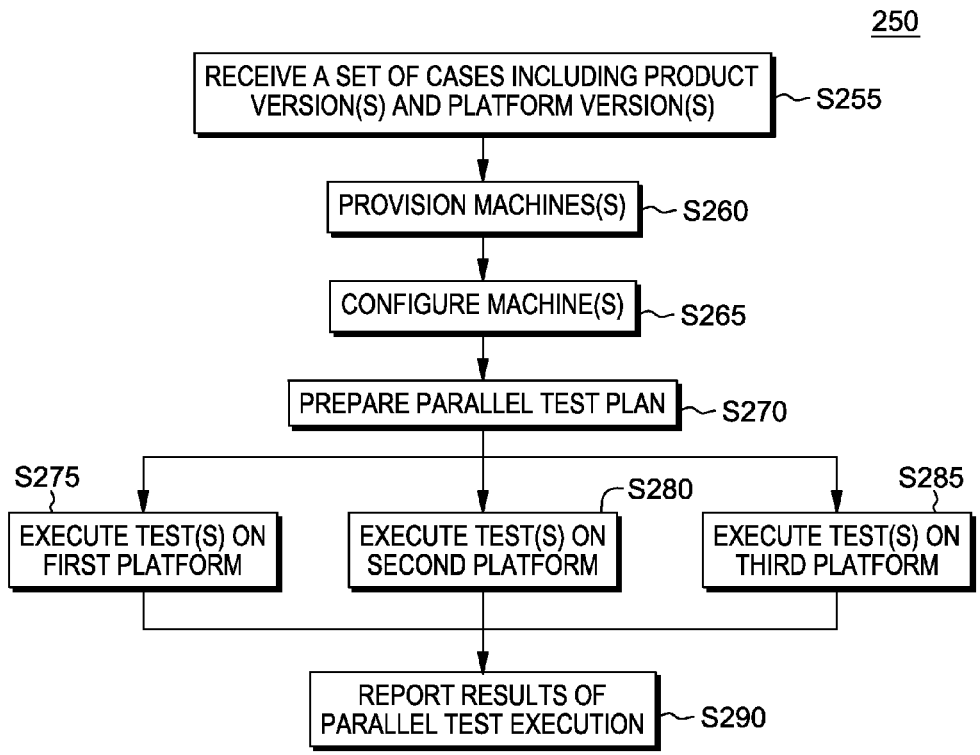
FIG. 2 is a flowchart showing a method performed, at least in part, by the first embodiment computer system.
Figure 3:
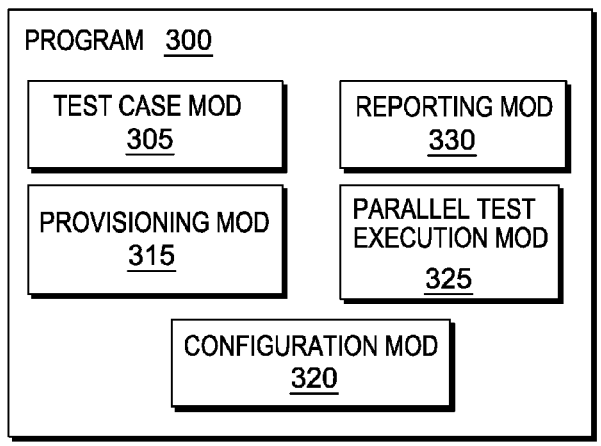
FIG. 3 is a schematic view of a portion of the first embodiment computer system.

FIG. 2 shows a flow chart 250 depicting a method according to the present invention. FIG. 3 shows program 300 for performing at least some of the method steps of flow chart 250. This method and associated software will now be discussed, over the course of the following paragraphs, with extensive reference to FIG. 2 (for the method step blocks) and FIG. 3 (for the software blocks).

Processing begins at step S255, where test case module 305 receives a set of three test cases over network 114 from a remote sub-system (not shown). Alternatively, the test cases, which need to be run may be determined and stored locally at sub-system 102 (see FIG. 1). In this example, each test case is in the form of a test bucket including multiple sub test cases (see definition of "test case" in Definitions sub-section, below). In this example, all three of the test cases relate to a build verification test, which is being performed for a piece of software under development.

Each of the three test cases is respectively designed for a different testing configuration (or, more simply, "configuration"). Each of the three respective configurations includes: (i) a product version; and (ii) a platform version (see definitions for "product version" and "platform version," below, in Definitions sub-section of the Detailed Description section). As will be further explained below, each of the three different configurations has a different product version and/or a different platform version, and it is the differences between the three configurations that necessitates the use of a different build verification test bucket for each of the three configurations.

The determination of the identity of the three required test cases occurs prior to step S255 of method 250. In this example, the determination of how many test cases and which test cases are needed involves a provisioning controller receiving input data and determining the testing configurations that make up a set of test cases. In this example, and as shown in tree diagram 340 of FIG. 4, the three testing configurations are as follows:

(i) Configuration 342a,b,c=LINUX, RED_HAT, VERSION_1.0, PATCH_1, 32_BIT, X486_PROCESSOR, SPREADSHEET, COMP_1, BUILD_2, PATCH_2;

(ii) Configuration 344a,b,c=LINUX, RED_HAT, VERSION_1.0, PATCH_1, 32_BIT, X586_PROCESSOR, SPREADSHEET, COMP_1, BUILD_2, PATCH_2; and (iii) Configuration 346a,b,c=LINUX, RED_HAT, VERSION_1.1, PATCH_2, 32_BIT, AMD_PROCESSOR, SPREADSHEET, COMP_1, BUILD_2, PATCH_2.

Figure 4:
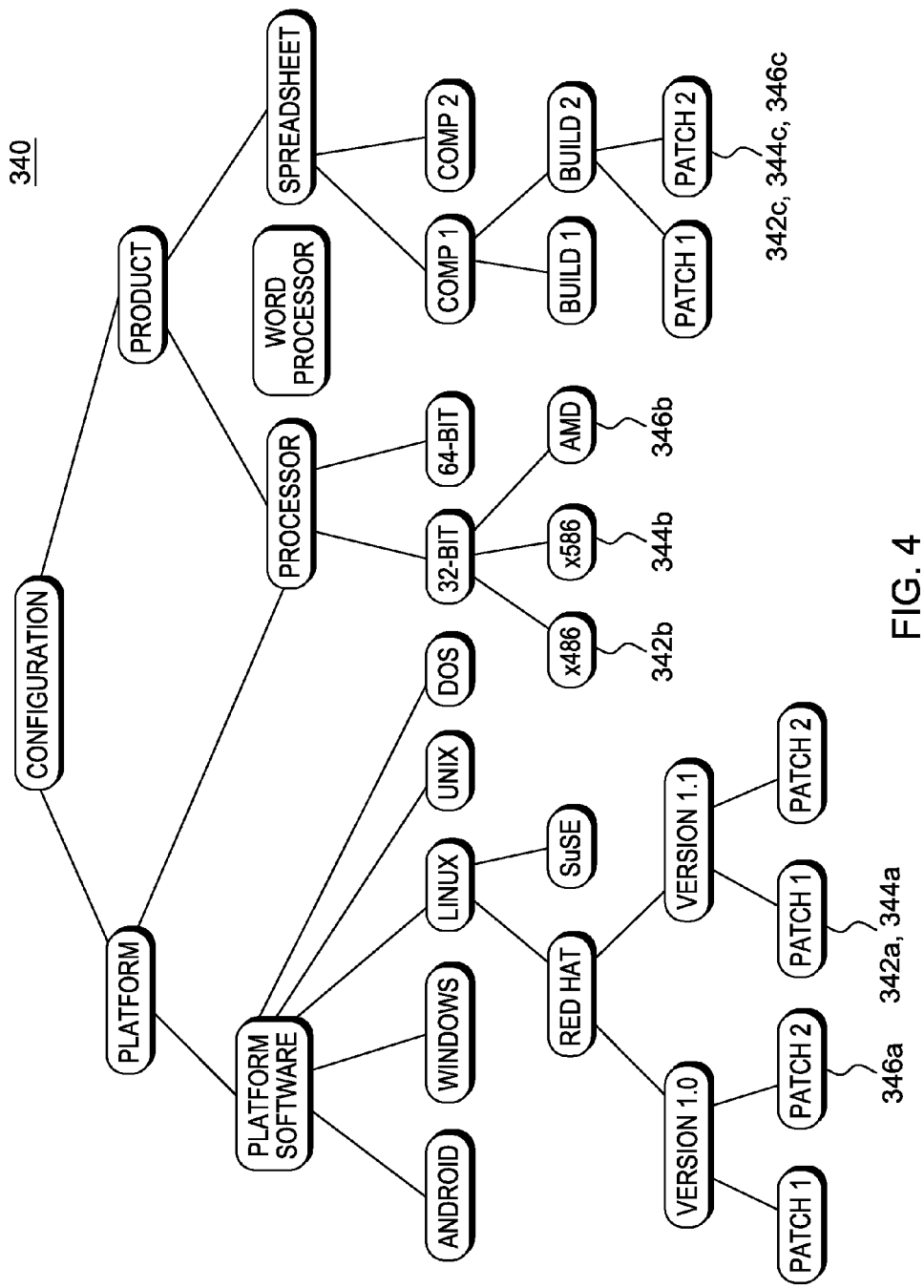
FIG. 4 is a tree diagram of some configuration inputs for use with the first embodiment system.

Again, it is the differences between configurations 342, 344, and 346 that lead to the use of three different test cases that are received and/or determined at step S255. A review of FIG. 4 shows how each of these configurations 342, 344, and 346 includes both a platform version (including, in this example, both OS and processor information) and a product version. Alternatively, the testing configuration may include even more information, or similar information at a higher or lower level of granularity, so long as the information included in each testing configuration is sufficient to determine the test case (for example, build verification phase test bucket) that needs to be run for the configuration.

Processing proceeds to step S260, where provisioning module 315 provisions the necessary machines, whether virtual, physical, or other computing resources, to be used for text case execution of the three test cases received at step S255. In this example, the provisioning is as follows:

(i) Configuration 342a,b,c is provisioned to first VM 110 of sub-system 104;

(ii) Configuration 344a,b,c is provisioned to second VM 111 of sub-system 104; and (iii) Configuration 346a,b,c is provisioned to third VM 112 of sub-system 106. (See FIG. 1 for locations of the provisioned machines.)

Processing proceeds to step S265, where configuration module 320 configures the provisioned machines with the software and/or hardware corresponding to the configuration designated by the test case including: (i) product version(s);

and (ii) platform version(s). Additionally, configuring may include, but is not limited to: (i) configuring dependent third party modules; (ii) configuring remote data sources; (iii) targeting dynamically provisioned systems and/or machines; (iv) targeting existing systems and/or machines; and/or (v) other relevant data sources, such as streaming data. The systems and/or machines may include one, or more, of the following: (i) relational database management systems (RDBMS); (ii) salesforce.com; (iii) message queues (MQ); (iv) Java messaging systems (JMS); and/or (v) web services. (Note: the term(s) "salesforce.com," and/or "Java messaging system," may be subject to trademark rights in various jurisdictions throughout the world and are used here only in reference to the products or services properly denominated by the marks to the extent that such trademark rights may exist). It should be noted that while only some examples of sources and/or targets are provided herein, any sources and targets now known or to be developed in the future may be configured in this step.

Processing proceeds to step S270, where parallel test execution module 325 controls execution of the three test cases respectively on VMs 110, 111 and 112 (see FIG. 1) in steps S275 (for configuration 342a,b,c), S280 (for configuration 344a,b,c), and S285 (for configuration 346a,b,c). Because the execution is parallel, that means that the test case execution will overlap, at least to a substantial degree, in time. However, parallel execution does not require that all of the parallel test case executions start or end at exactly the same time. As stated above, in some embodiments, different test cases for different testing configurations may run in series on one parallel execution branch (which is to say, one set of provisioned and configured machine(s)). However, in these embodiments, there will only be parallel execution of test cases when there is more than one set of provisioned machines running test cases for different test configurations at overlapping times.

Figure 5:
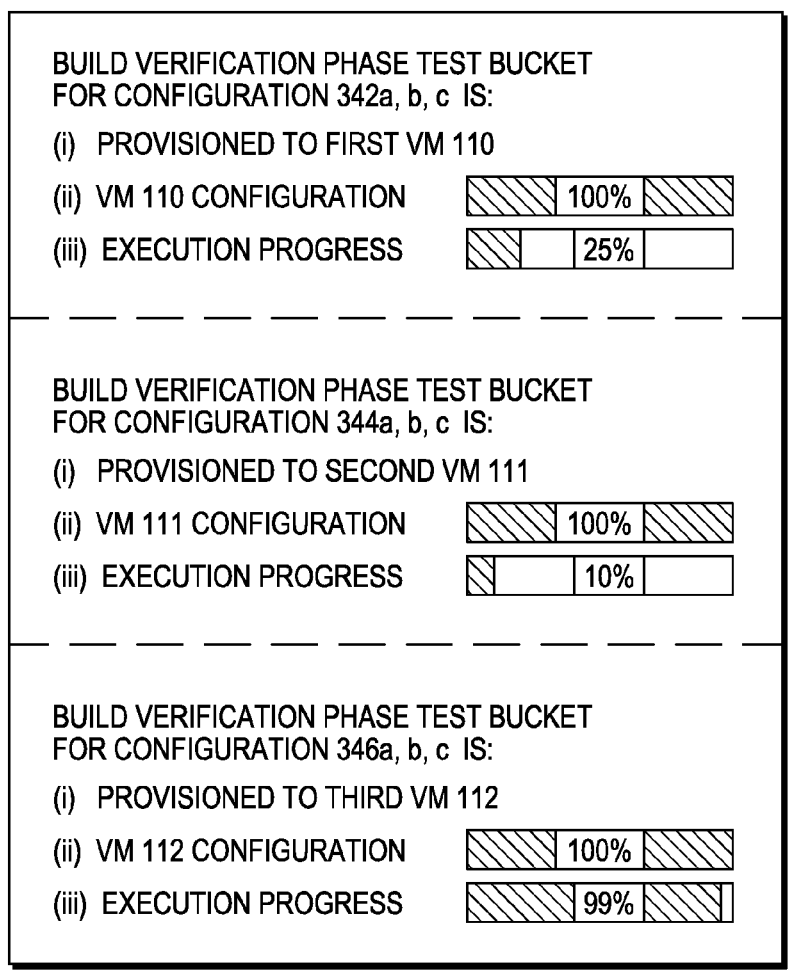
FIG. 5 is a screen shot generated by the first embodiment system.

Screen shot 350 of FIG. 5 shows how the three test cases run in method 250 do not finish execution at the same time, even though they are running in a temporally overlapping manner.

Processing proceeds to step S290, where reporting module 320 reports the results of the parallel test program execution. In this example, this reporting is similar in form and format to conventional test case reporting where all test cases are run in series, rather than parallel.

III. Further Comments and/or Embodiments

Some embodiments of the present invention recognize that the following tasks associated with end-to-end automation of using test cases to test software can pose difficulties or issues, such as the following: (i) specifying how many machines of a given operating system (OS) type are to be provisioned with the build; (ii) installing the image of product under test; (iii) determining which set of test cases are to be executed on which machine; (iv) provisioning machines in a cloud infrastructure; and/or (v) executing the test cases in parallel such that the whole task is completed in an minimum amount of time.

Some embodiments of the present disclosure further recognize that: (i) a test bucket will often be performed at various, different test phases during the software development process; (ii) each test phase has a different set of test cases and different "platform" (for example, OS) coverage; (iii) when executing each of these test phases, a common approach includes: (a) provisioning a machine, (b) setting up the machine, (c) installing required components and/or patterns, (d) updating patch level, and (e) setting up the required test beds; (iv) the steps involved in executing the test phases are often repeated many times and are time consuming; (v) cloud offerings are available for provisioning machines based on various patterns; (vi) multiple frameworks are available that provide automated execution of test cases and provide end to end automation; and/or (vii) multiple installs of the same product are required to account for each development team needing to execute their respective test cases.

Some embodiments of the present disclosure include one, or more, of the following features, characteristics, and/or advantages: (i) specifies OS requirement, OS patch level, product build, product patch level, number of machines in an automated manner based on test bed requirement, and build changes; (ii) provides automated determination of which set of test cases are to be executed and dynamic automated allocation of those test cases; (iii) provides automated provisioning of machines in a cloud infrastructure across geographies and multiple data centers; (iv) provides automated execution of test cases, in parallel, to complete the whole task in a optimum time based on resource availability; (v) automated provisioning and setup is less error prone than the conventional manual process; (vi) reduces time and configurational complexity (for example, MPP, clustered application server, high availability systems, grid) for testing cycles (for example, complex configurations do not need to be repeated for every build); and/or (vii) systems may include facilities for all possible platforms.

Test case execution requires having hardware that is based on the corresponding execution requirement. Some embodiments of the present disclosure provide for the hardware requirement to be provisioned independent of data centers and/or cloud systems as provisioning is based on resource availability at run-time. For example, in some case procuring a new virtual machine rather than using statically assigned virtual machine improves efficiency. In that way, tests can be run at a designated location or across geographies depending upon dynamically changing requirements. Further, some embodiments of the present disclosure set up the required configurations and/or dependencies including: (i) a virtual machine environment; and/or (ii) complex configurations such as massively parallel processors (MPP), cluster, and/or high availability computing.

Some embodiments of the present disclosure provide for a user to perform end-to-end automation simply by specifying in comma-separated values (CSV) file: (i) the test suite; and (ii) platform/OS coverage. When the user inputs this data, the computer system: (i) reads the CSV file; (ii) determines how many machines of each OS type are to be provisioned; and (iii) executes the test cases in parallel. Alternatively, any other format besides CSV may be used where the system can consume the input for end-to-end execution including provisioning and/or configuration. Other formats include, but are not limited to: (i) XML; (ii) database; and/or (iii) web service.

Consider, for example, Organization A has automated its product test cases such that it typically executes: (i) 25% of the test cases (TCs) on Red Hat Enterprise Linux (RHEL) 6 32-bit as part of the build verification test; (ii) 50% of TCs as part of the sanity test on SuSE Linux Enterprise Server (SLES) 11 64-bit and Windows Server 2008 64-bit; and (iii) 100% of TCs as part of the regression test on RHEL 5 64-bit, RHEL 6 32-bit, SLEX 11 64-bit, SLEX 10 64-bit and Windows Server 2008 64-bit. (Note: the term(s) "Linux," "Red Hat," "Red Hat Enterprise Linux," "RHEL," "SuSE," "SuSE Linux Enterprise Server," "SLES," "Windows," and/or "Windows Server" may be subject to trademark rights in various jurisdictions throughout the world and are used here only in reference to the products or services properly denominated by the marks to the extent that such trademark rights may exist.) Some embodiments of the present disclosure provide for many other combinations, database client versions, server versions, application server versions, repository databases, product builds, multi-tiers, clustered applications servers, high availability systems, grids, MPP, and/or symmetric multiprocessor (SMP). Some embodiments of the present disclosure provide a method where Organization A easily specifies its needs in three different CSV files to automate its end-to-end process.

Consider again, for example, an environment where a user needs to test a software product having four components: C1, C2, C3, and C4. Component C1 is the largest of the components, and component C2 is the next largest. It takes days to run all of the test cases. The test case bucket of component C1 is divided into four parts: C1P1, C1P2, C1P3, and C1P4. Similarly, the test case bucket of component C2 is divided into two parts: C2P1 and C2P2. After breaking up the test case buckets, the components include: C1P1, C1P2, C1P3, C1P4, C2P1, C2P2, C3, and C4.

For the best platform coverage, the user decides to run the component test cases on the following operating systems in a predefined combination: (i) Windows Server 2008 32-bit; (ii) Windows Server 2008 64-bit; (iii) RHEL 5.7 32-bit; (iv) RHEL 6.2 64-bit; (v) SLES10 32-bit; (vi) SLES11 64-bit; (vii) Advanced Interactive eXecutive (AIX) 6.1, and (viii) AIX 7.1. (Note: the term(s) "Advanced Interactive eXecutive" and "AIX" are IBM trademarks.)

Some embodiments of the present disclosure define this combination in a simple CSV file, where a "1" means the component will be tested on the corresponding platform and a "0" means that component will not be tested on the corresponding platform. A matrix combining test cases to corresponding operating systems is shown in Table 2.

TABLE 2

Sample Platform and Component Striping Matrix

| Platform | C1P1 | C1P2 | C1P3 | C1P4 | C2P1 | C2P2 | C3 | C4 |
|---|---|---|---|---|---|---|---|---|
| WIN32 | 1 | 0 | 0 | 0 | 1 | 0 | 0 | 1 |
| WIN64 | 0 | 1 | 0 | 1 | 0 | 1 | 1 | 0 |
| RH5732 | 0 | 0 | 0 | 0 | 1 | 0 | 0 | 0 |
| RH6264 | 1 | 0 | 0 | 0 | 0 | 1 | 0 | 0 |
| SU1032 | 0 | 0 | 1 | 0 | 0 | 0 | 1 | 0 |
| SU1164 | 0 | 0 | 0 | 0 | 0 | 0 | 0 | 1 |
| AIX61 | 0 | 1 | 0 | 0 | 1 | 0 | 0 | 0 |
| AIX71 | 0 | 0 | 0 | 1 | 0 | 1 | 1 | 1 |

Some embodiments of the present disclosure use a conventional forge tool to automate the execution flow and interaction. Further, some embodiments of the present disclosure use representational state transfer (REST) calls to a delivery service of a service delivery manager for provisioning the machines. Still further, some embodiments of the present disclosure use a service delivery manager as a reference cloud for provisioning.

The execution flow, according to some embodiments of the present disclosure, includes: (i) using a poller script to monitor the build server for install images, to download the install images to local file server as the images become ready, and to create a buildInfo.txt file for each image (poller script is a system that continuously checks for the existence of a new software build available on location, provided in various input arguments, or via files, and, upon availability, initiates build availability and consistency checks before triggering a download to various machines across geographies for consumption, and confirms a completed download before triggering the required provisioning of systems based on test system requirements); (ii) determining machine provisioning with a base template for every buildInfo.txt file that is created; (iii) installing a fix pack based on the platform and component striping matrix; (iv) creating templates (for example: if the platforms RHEL 32 and SLES 32 are in the striping matrix, when the Linux 32 image becomes available, the system creates two templates); (v) storing template IDs in platform-specific template properties (for example, the template_WIN2K832.properties file is a stored template); (vi) provisioning machines according to the platform striping matrix; and (vii) kicking of test case execution on the machines when machine_xxx.properties files are ready.

For example, when the Windows 32 bit fix pack image is downloaded, a Windows Server 2008 32-bit template with the base version of the product is provisioned, and the fix pack is installed then a new template with the fix pack is created. Because the user specified executing components C1P1, C2P1, and C4 on the Windows Server 2008 32-bit platform, three machines are provisioned automatically and three machine_xxx.properties files are created, where "xxx" represents a combination of platform and component.

Some embodiments of the present disclosure provide the flexibility to change the platform striping matrix without making code changes and the flexibility to run tests on available machines and the desired components.

Figure 6:
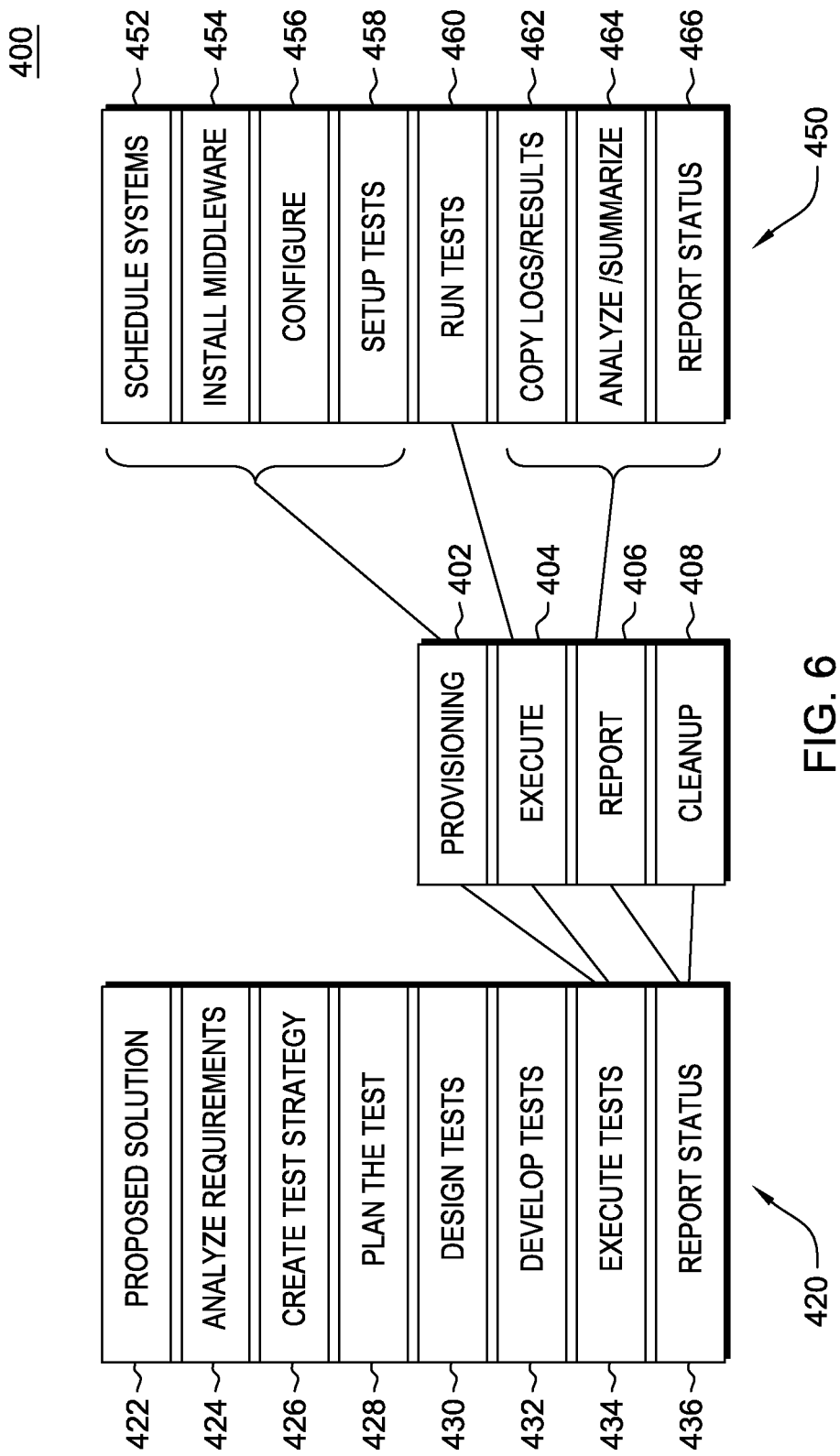
FIG. 6 is a diagram of a test cycle according to an embodiment of the present invention.

FIG. 6 is a diagram of complete testing cycle 400 according to some embodiments of the present disclosure. The complete testing cycle includes: provisioning process 402; execution process 404; reporting process 406; clean up process 408; engineering perspective activities 420; solution proposal 422; requirements analysis 424; test strategy creation 426; testing plan 428; testing design 430; testing development 432; tests execution 434; status reporting 436; execution perspective activities 450; systems scheduling 452; middleware installation 454; systems configuration 456; test set up 458; running a test 460; retrieve logs and/or results 462; analyze and/or summarize results 464; and produce status reports 466.

In the illustrated testing cycle, it can be seen that provisioning process 402 and execution process 404 are frequently and repeatedly performed from the engineering perspective activities 420 and the execution perspective activities 450. Some embodiments of the present disclosure automate the provisioning and execution processes in order to: (i) remove inefficiencies; (ii) shorten time-to-market; and (iii) increase quality. Some embodiments of the present disclosure provide a 35% reduction of the complete testing cycle time. These benefits are multiplied when many releases and/or maintenance cycles are involved.

Some embodiments of the present disclosure may include one or more of the following features, characteristics, and/or advantages: (i) consistency in releasing patches every time; (ii) successful release of patches every time; (iii) time saving by automating manual server management tasks; (iv) minimized risk by automating manual server management tasks; (v) provisioning management; (vi) configuration management; (vii) manage physical assets in a variety of environments across geographies; (viii) manage virtual assets in a variety of environments across geographies; (ix) reduced provisioning time helps increase coverage; (x) reduced configuration time helps increase coverage; (xi) reduced execution cycle with parallel executions on multiple machines; (xii) lifecycle management; (xiii) sharing of infrastructure (capacity on-demand); (xiv) rapidly build complex hardware test environments; (xv) rapidly build complex software test environments; (xvi) reliably build complex hardware test environments; (xvii) reliably build complex software test environments; (xviii) change environments on-demand; (xix) save environments on-demand; (xx) restore environments on-demand; (xxi) provide a technique to achieve completely automated provisioning across geographies and data centers; and/or (xxii) provide a technique to achieve completely automated regression cycles across geographies and data centers.

Some embodiments of the present disclosure may include one or more of the following features, characteristics, and/or advantages: (i) completely automated and dynamic machine provisioning and parallel test case execution; (ii) user input is simply specifying the test suite and platform or OS; (iii) detecting how many machines of each OS type are to be provisioned; (iv) provision machines dynamically across geographies, data centers (DC), and/or clouds based on resource, platform, versioning, and test requirements; (v) dynamically configuring the provisioned machine with required dependent modules; (vi) download and install required patch level and applications; (vii) executes the test cases in parallel and produce results; (viii) validate the results; (ix) generate benchmark report providing deviation from previous execution; (x) alert the development teams with results details, sharing required data; (xi) share the machine details for manual testing and/or verification; and/or (xii) upon completion of the process, release the provisioned machine and free the resource.

Some embodiments of the present disclosure perform a process including: (i) monitoring build server for install images using poller script; (ii) triggering downloads of the images to designated file server on different locations; (iii) creating files post-download confirming validity of file contents; (iv) triggering the provisioning of the initial set of machines on different data centers based on the platform striping matrix input for build (such as RHEL, SuSe, AIX, Windows, etc.); (v) triggering the product install on the decided pattern on provisioned machines on each platform combination; (v) converting to template and registering with backend and using generated ID for future reference; (vi) alerting testing controller of a forge tool when the product is ready to be used and tested; (vii) testing automated framework trigger required set of machines choosing the pattern and platform; (viii) multiple machines are provisioned, configured for required test-bed including any databases or application servers or web servers and other dependencies, details registered with the testing controller and generate machine details; (ix) testing controller based on machine details triggers the required test cases on different machines provisioned; (x) results produced, verified, and updated on the dashboard with alert sent; (xi) alert the teams with results details, share required data; (xii) share the machine details for manual testing and/or verification; and (xiii) release the machine and free resource for use in the next cycle. In this example process, multiple test teams are not required to install the software images because once installed, they are available to be used again.

Some embodiments of the present disclosure may include one or more of the following features, characteristics, and/or advantages: (i) flexibility to change the platform and component striping matrix without making code changes; (ii) flexibility to run tests on available machines and desired components; (iii) works with any cloud offerings, data centers, or hypervisors; (iv) works with platforms including: Intel, Hewlett Packard, and/or Solaris; (v) provisioning may be accomplished by one or more of: workflows, shell scripts, Python, extensible markup language (XML), and/or REST services to a services delivery manager. (Note: the term(s) "Intel," "Hewlett Packard," "Solaris," and/or "Python" may be subject to trademark rights in various jurisdictions throughout the world and are used here only in reference to the products or services properly denominated by the marks to the extent that such trademark rights may exist.)

Figure 7:
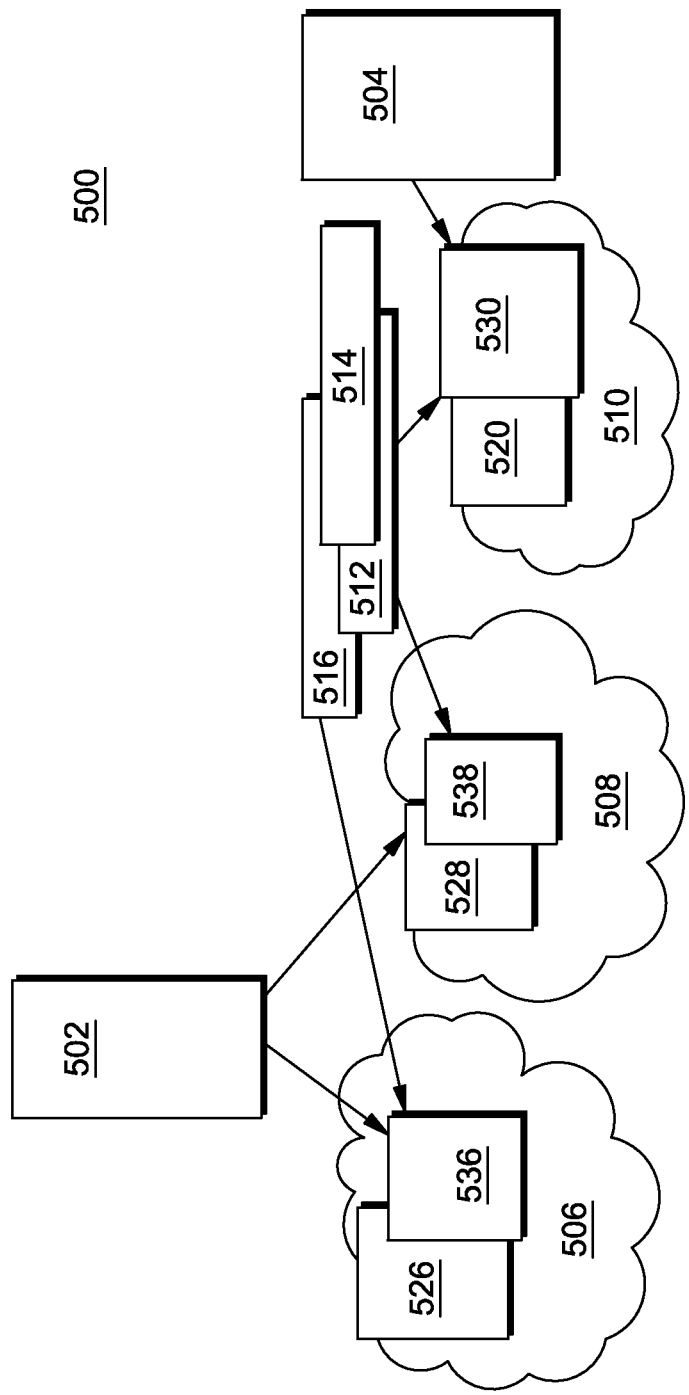
FIG. 7 is a schematic view of a second embodiment of a networked computers system according to the present invention.

FIG. 7 is a schematic view of networked computers system 500 according to an embodiment of the present disclosure. The networked computers system includes: server computer sub-systems 502, and 504; cloud computing sub-systems 506, 508, and 510; virtual machines 520, 526, 528, 530, 536, and 538; and client virtual machines 512, 514, and 516.

Figure 8:
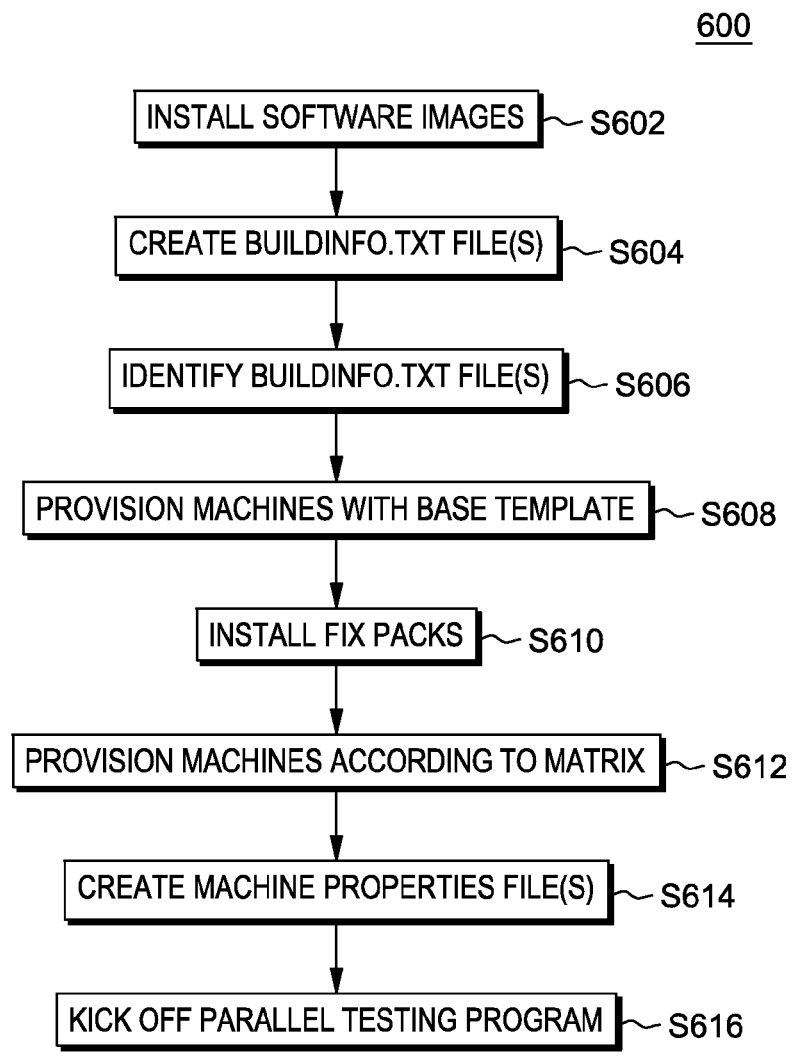
FIG. 8 is a flowchart showing a method performed, at least in part, by the second embodiment computer system.

FIG. 8 is a flowchart depicting automation design process 600 according to an embodiment of the present disclosure. This method and associated networked computers system 500 (see FIG. 7) will now be discussed, over the course of the following paragraphs.

Processing begins with step S602, where images of the product under test are installed in a local server(s), such as servers 502 and 504, typically one image is installed per OS (such as AIX, Windows 32-bit, Windows 64-bit, Linux 32-bit, Linux 64-bit, xLinux, HP-UX, and Solaris). (Note: the term(s) "xLinux" and/or "HP-UX" may be subject to trademark rights in various jurisdictions throughout the world and are used here only in reference to the products or services properly denominated by the marks to the extent that such trademark rights may exist.) In this step, poller script monitors and downloads the images to the local file server(s). It should be noted that, in some embodiments of the present disclosure, poller scripts steps are performed by various orchestration scripts on top of Build Forge, or other equivalent orchestration software, on provisioned machines and in an automated manner to trigger: (i) installation of the product(s); (ii) configuration of the product(s); and/or (iii) deployment steps such as MPP, high availability, and cluster configuration. Alternatively, other configurations are employed for testing to address various other complex scenarios and/or different tiers and repositories.

Processing proceeds to step S604, where poller script creates one buildinfo.txt file per image. The buildinfo.txt file includes: (i) image location; (ii) platform; (iii) updater location; and/or (iv) updater platform. For example one buildinfo.txt file may be named, "Lin32_buildinfo.txt." As files are processed, they are moved to a different directory.

Processing proceeds to step S606, where Build Forge looks for buildinfo.txt files. Alternatively, automation software other than Build Forge is used.

Processing proceeds to step S608, where, for every buildinfo.txt file that is found, a machine is provisioned with a base template according to the platform and component striping matrix (see Table 2). Accordingly, the virtual machine (VM) templates with base versions of the product under test are identified by different IDs. For example, there is one WIN2K8 32-bit VM with the base version, one RHEL 62 64-bit VM with the base version, and one SuSE 10 32-bit VM with the base version.

Processing proceeds to step S610, where fix packs are installed on the VMs, and fix pack templates are created. Template properties file(s) are created where each fix pack template has a different template ID. For example, there is one WIN2K8 32-bit VM with a fix pack, one RHEL 62 64-bit VM with a fix pack, and one SuSE 10 32-bit VM with a fix pack.

Processing proceeds to step S612, where VMs are provisioned according to the platform and component striping matrix. When this step occurs, there are pre-defined resources in each cloud sub-system 506, 508, and 510, such as VMs 520, 526, 528, 530, 536, and 538. Where to provision (to which pool) is defined according to: (i) resources on the VMs; and (ii) execution of component-specific workflows.

Processing proceeds to step S614, where the file(s) "machine_xxx.properties" are created. Within the term, "machine_xxx.properties," the "xxx" represents a combination of platform and component, which is passed to provisioning step. For example, once "template_WIN2K832.properties" is created (a template properties file from step S610), the platform and component striping matrix is consulted, and three Windows 32 machines are provisioned accordingly and a machine_WIN2K832.properties file is created. The client machine(s) 512, 514, and 516 are part of machine_xxx.properties. In that way, the client machines and the VMs are paired.

Processing proceeds to step S616, where a parallel testing program is kicked off using the provisioned and configured machines.

Some embodiments of the present disclosure may include one or more of the following features, characteristics, and/or advantages: (i) optimizes release cycle of any software product; (ii) on-demand provisioning controller comprising multiple hypervisors, clouds, data centers, Solaris Zones, virtual machines, POWER Systems, logical partitions (LPAR), system workload partitions (WPAR), hard partitioning (HP) nPAR; and/or HP vPAR (1 . . . n) (Note: the term(s) "Solaris" "Zones," and/or "Solaris Zones" may be subject to trademark rights in various jurisdictions throughout the world and are used here only in reference to the products or services properly denominated by the marks to the extent that such trademark rights may exist.); (iii) provides a centralized, automated access point to provision a machine based on chosen pattern and resource requirements and availability across geographies and locations in automated manner; (iv) a test controller that decides pattern and resource requirements based on: test bucket requirements, the set of test cases meant for the pattern; (v) provisions machines across platforms and versions in an automated manner; (vi) a configuration system that configures the provisioned machine at the desired location with the desired components and software and produces verified results; (vii) applies user-specified components to provide completely automated software product release cycle; and/or (viii) test controller determines resource and pattern requirements for specific test execution cycle and provides input to on-demand provisioning controller.

Some embodiments of the present disclosure may include one or more of the following features, characteristics, and/or advantages: (i) on-demand provisioning controller allocates required resources across geographies and platforms and specific releases based on the requirement request provided by test controller; (ii) on-demand provisioning controller dynamically identifies various available software images (templates) for a specific platform and patterns across data centers, geographies, clouds, and available infrastructure for provisioning; (iii) on-demand provisioning controller dynamically provisions the virtual machines across platform, versions, and geographies based on the requirement and decided pattern (virtualized machines including: Intel, Hewlett Packard, and/or Solaris Zones); (iv) determining the location if system resources are not available in the desired cloud based on priority of the selected infrastructure; (v) on-demand provisioning controller converts the installed and configured machine into a template image and generates ID for simultaneous use by multiple test cases as determined by the test controller for provisioning multiple machines from the same image to reduce install time; (vi) configuration system sets up the provisioned machines as required by the test controller including the installation of various software images and patterns; (vii) on-demand provisioning controller provisions machines on multi-tier patterns, grid, high availability systems, or MPP dynamically; (viii) configuration system sets up the provisioned machines as required by the test controller; (ix) configuration system sets up clustered application server, web server, and database repositories as required by the test controller; (x) on-demand provisioning controller stores the software image for future release of the template and returns the resources in an automated manner; (xi) through communications between the on-demand provisioning controller and the configuration controller generate new patterns in automated manner for future requirements; and/or (xii) test controller provides benchmarks across builds and releases in automated manner and benchmarks a deviation in execution cycle across the test suite.

Some embodiments of the present disclosure may include one or more of the following features, characteristics, and/or advantages: (i) test analysis based on analysis of on-demand provisioning controller increasing and/or decreasing the number of machines that can be provisioned for specific test buckets and modules; (ii) altering test bucket execution dynamically to improve cycle execution time if more resources are available; (iii) containing the execution in the pool in case resources are not available in all places; (iv) testing controller dynamically increases the number of machines required to execute the test cycle in an automated manner to improve the cycle; (v) the on-demand provisioning controller pools the provisioning request(s) submitted by the testing controller in the event that no resources are available and to trigger it when resources becomes free (this happens when the on-demand provisioning controller and the testing controller are still synchronizing when a new request is triggered); (vi) the system utilization controller provides a benchmark analysis on resource utilization across builds and stores them in the database repository and provides a module to co-relate with the benchmark analysis generated by the test controller; (vii) the utilization controller provides a testing cycle benchmark to determine whether any test bucket(s) deviate from the previous build benchmark on resource utilization; (viii) the system utilization controller provides the platform-specific and version-specific analysis in the same test bucket run across two different platforms and/or machines with different resources; (ix) the on-demand machine for development provisions the machine with the desired pattern for regular development or testing that is not dependent on the rest of the testing cycle by using the on-demand provisioning controller, which allows any user to have access rights; (x) the configuration system configures the computer system based on the desired input, as provided by the user, and receives machine details in response (this may be done: from the command line, as allowed by automation, and/or from the internet, where the user may submit the request form and receive the machine details are the end of the provisioning cycle).

Some embodiments of the present disclosure take the following actions: (i) provisions and configures the machines across platforms; (ii) dynamically generates patterns where the same image may be used multiple times across teams and geographies during the testing and development cycle; and/or (iii) optimizes the execution cycle.

Some embodiments of the present disclosure may include one or more of the following features, characteristics, and/or advantages: (i) generates pattern of complex setup such as grid, MPP, high availability systems, clustered application server, multi-tier, and/or cross platform tiers and allows the pattern to be used in an automated manner across platforms, geographies, and builds during the development and testing cycle; (ii) allows provisioning and configuring the machines based on any repository requirement and configures those machines dynamically without manual intervention; (iii) normal execution of doing provisioning or configuring machines every time for individual data centers and/or platforms; (iv) trigger test buckets once the machine is available; (v) spread test execution across platforms based on manual identification process; (vi) an extension of the cloud model, which many customers and/or competition will need to use to optimize their organizations; (vii) the use of multiple clouds in a geography independent data center; and/or (viii) enhanced cloud offerings apart from optimizing internal processes.

Some embodiments of the present disclosure may include one or more of the following features, characteristics, and/or advantages: (i) more than a hardware appliance capable of using existing patterns and images or create them manually from a user interface; addresses the end-to-end automation requirements; (ii) design testing process automatically; (iii) may be used multiple times; (iv) re-generates patterns in automated manner; (v) is applicable where multiple patterns and/or images are generated dynamically with different builds and/or components being installed without any manual intervention; (vi) runs on any cloud offering without any requirement of hardware appliance; (vii) runs without user intervention; (viii) uses existing images and/or patterns; (ix) creates new images and/or patterns at run-time, without any user intervention; (x) runs across platforms including: kernel-based virtual machine (KVM), Sun, and HP (Note: the term "SUN" may be subject to trademark rights in various jurisdictions throughout the world and are used here only in reference to the products or services properly denominated by the marks to the extent that such trademark rights may exist.); (xi) covers Intel's platform in totality (not limited to VMWare ESX) (Note: the term(s) "VMWare" and/or "ESX" may be subject to trademark rights in various jurisdictions throughout the world and are used here only in reference to the products or services properly denominated by the marks to the extent that such trademark rights may exist.); and/or (xii) works for business cases where multiple machines are needed with every build, or every release, across platforms and/or geographies.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine-readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Test case: a related set of one, or more, test cases is herein referred to as a "test case;" for example, a test bucket of related test cases may be herein referred to as a single "test case;" where it is helpful for clarity, a test case having multiple, related constituent test cases may be referred to as a test case having multiple "sub test cases."

Platform: includes operating system version, processor(s) versions, and/or hypervisor(s) versions.

Platform version: a platform that is fully identified and specified for the purpose of selecting test case(s) to run; there is not necessarily a predetermined level of granularity to fully define a platform version; for example, in one embodiment, one might only need to know whether the platform is DOS or LINUX to select test cases but, in a contrasting example, one may need to know distribution version numbers of the OS, processor information, and/or other information to fully specify a "platform version" in order to have enough information to choose a proper test case.

Product version: a software product that is fully identified and specified for the purpose of selecting test case(s) to run; there is not necessarily a predetermined level of granularity to fully define a product version but, rather, the desired granularity will depend upon how much granularity there is as between variations of the software product(s) and how much granularity there is with respect to different test cases designed for the different software product(s).

Set of computing resources: may include one or more virtual and/or real machine and/or computer.

What is claimed is:

1. A method comprising:
receiving, by a processor, a plurality of test cases respectively corresponding to a plurality of software configurations;
provisioning a set of computing resources for running the plurality of test cases in parallel; and
configuring the set of computing resources for running the plurality of test cases in parallel;
wherein:
the receiving a plurality of test cases includes receiving a file having data corresponding to attributes of the plurality of software configurations;
the attributes of the plurality of software configurations include at least:
a plurality of operating system versions; and
a plurality of product versions; and
at least the provisioning and configuring is performed automatically by machine logic.

2. The method of claim 1 further comprising:
executing the plurality of test cases, in parallel, on the set of computing resources.

3. The method of claim 1 wherein the file is a comma separated value file.

4. A computer program product comprising software stored on a software storage device, the software comprising:
- first program instructions programmed to receive, by a processor, a plurality of test cases respectively corresponding to a plurality of software configurations;
- second program instructions programmed to provision a set of computing resources for running the plurality of test cases in parallel; and
- third program instructions programmed to configure the set of computing resources for running the plurality of test cases in parallel;

wherein:
- the receiving a plurality of test cases includes receiving a file having data corresponding to attributes of the plurality of software configurations;
- the attributes of the plurality of software configurations include at least:
  - a plurality of operating system versions; and
  - a plurality of product versions; and
- the software is stored on a software storage device in a manner less transitory than a signal in transit.

5. The computer program product of claim 4 further comprising:
- fourth program instructions programmed to execute the plurality of test cases, in parallel, on the set of computing resources.

6. The computer program product of claim 5 wherein the file is a comma separated value file.

7. A computer system comprising:
- a processor(s) set; and
- a software storage device;

wherein:
- the processor set is structured, located, connected, and/or programmed to run software stored on the software storage device; and
- the software comprises:
  - first program instructions programmed to receive, by a processor, a plurality of test cases respectively corresponding to a plurality of software configurations;
  - second program instructions programmed to provision a set of computing resources for running the plurality of test cases in parallel; and
  - third program instructions programmed to configure the set of computing resources for running the plurality of test cases in parallel;

wherein:
- the receiving a plurality of test cases includes receiving a file having data corresponding to attributes of the plurality of software configurations; and
- the attributes of the plurality of software configurations include at least:
  - a plurality of operating system versions; and
  - a plurality of product versions.

8. The computer system of claim 7 further comprising:
- fourth program instructions programmed to execute the plurality of test cases, in parallel, on the set of computing resources.

9. The computer system of claim 7 wherein the file is a comma separated value file.

* * * * *